No. 829,620. PATENTED AUG. 28, 1906.
E. A. AUSTIN.
SAFETY CAN LIFTER.
APPLICATION FILED NOV. 14, 1905.
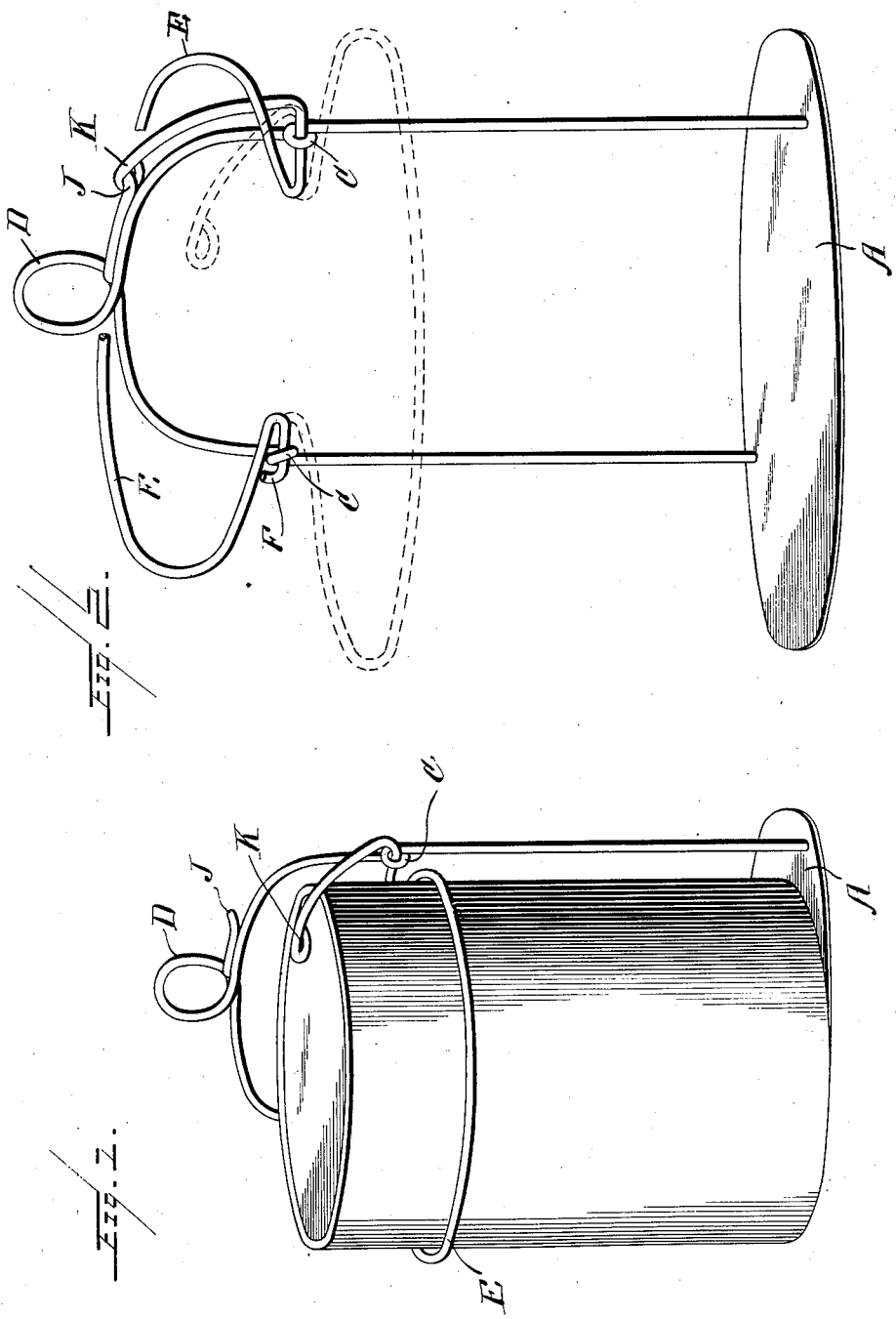
WITNESSES:
INVENTOR
Emily A. Austin,
By Franklin H. Hough
Attorney

UNITED STATES PATENT OFFICE.

EMILY A. AUSTIN, OF BETHEL, NEW YORK.

SAFETY CAN-LIFTER.

No. 829,620.

Specification of Letters Patent.

Patented Aug. 28, 1906.

Application filed November 14, 1905. Serial No. 287,359.

*To all whom it may concern:*

Be it known that I, EMILY A. AUSTIN, a citizen of the United States, residing at Bethel, in the county of Sullivan and State of New York, have invented certain new and useful Improvements in Safety Can-Lifters; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in can-lifters, and comprises a simple and efficient means whereby a jar or can which has been placed in boiling water may be raised therefrom without burning the fingers of the operator, and comprises also a disk having a standard thereon the upper portion of which is turned to form an eye to be utilized as a handle and the provision of a bail which may be lowered to encircle a can and adapted to be held from over the can by engagement of an end of said bail with a hook projecting from the standard.

This invention comprises various other details of construction and combinations and arrangements of parts, which will be hereinafter fully described and then specifically defined by the appended claims.

I illustrate my invention in the accompanying drawings, in which—

Figure 1 is a perspective view of my device to which a can is applied; and Fig. 2 is an enlarged perspective view of the device, showing in full lines the encircling bail held in an upright position and in dotted lines at its lowest can-engaging position.

Reference now being had to the details of the drawings by letter, A designates a disk forming the base of my can-supporting device, and rising from said base is a standard made, preferably, of a wire, the ends of which are fastened to the base, and each leg of said wire is bent to form an eye C, and the middle portion of said wire forming said standard is turned into an eye D, forming a handle, whereby the device may be conveniently carried.

E designates a bail made of wire bent in circular outline, with portions of said wire bent in alinement with each other and having bearings in said eyes C. One end F of said wire forming the bail is bent at an angle and is adapted to hold the wire in the adjacent eye, and the opposite end of the wire forming the bail is bent at an angle to the plane in which the bail is disposed and has an eye K formed at its extreme end, designed to engage a hook J, which projects from the standard at any suitable location. It will be understood that the arm of the bail which has said eye K is preferably resilient and adapted to spring over and engage said hook as the bail is raised to its highest position, thus insuring means for holding the bail suspended.

In use the operator pushes the disk or base underneath a jar or can, and releasing the eye K from said hook said bail may fall by gravity over the can or may be turned down by utilizing the arm of the bail having said eye K as a handle. By this means the can or jar may be held upon the standard without sliding off the same while a person raises the device, with the jar, out of the kettle or other receptacle in which the jar or can has been heated. By raising the handle at the end of the bail the jar may be easily slid off the disk or base, as will be readily understood.

Having thus fully described my invention, what I claim as new, and desire to secure by Letters Patent, is—

1. A device for lifting jars, consisting of a disk, a standard rising therefrom, a bail pivotally mounted upon said standard and adapted to encircle a jar resting upon said disk, one end of said bail being bent to form an arm with an eye at the end thereof, and a hook upon the standard adapted to be engaged by said eye whereby said bail may be held in an elevated position, as set forth.

2. A device for lifting jars, comprising a disk, a wire bent at its longitudinal center to form an eye, the ends of said wire secured to said disk, each leg of said wire being bent to form an eye, a bail made of a single piece of wire and adapted to encircle a jar resting upon said disk, portions of said wire forming the bail having bearings in the eyes of said standard, a hook upon the standard, and a portion of the wire forming said bail bent to form a resilient arm with an eye at the end designed to engage said hook, as set forth.

In testimony whereof I hereunto affix my signature in the presence of two witnesses.

EMILY A. AUSTIN.

Witnesses:
 ANNA S. DU BOIS,
 LYDIA E. AUSTIN.